(12) United States Patent
Erdos et al.

(10) Patent No.: US 10,088,098 B2
(45) Date of Patent: Oct. 2, 2018

(54) LATTICE MOUNTING DEVICE

(71) Applicant: DISH Network L.L.C, Englewood, CO (US)

(72) Inventors: David Eugene Erdos, Parker, CO (US); David Michael Lettkeman, Parker, CO (US)

(73) Assignee: DISH Network L.L.C., Englewood, CO (US)

( * ) Notice: Subject to any disclaimer, the term of this patent is extended or adjusted under 35 U.S.C. 154(b) by 494 days.

(21) Appl. No.: 14/273,322

(22) Filed: May 8, 2014

(65) Prior Publication Data

US 2015/0323124 A1    Nov. 12, 2015

(51) Int. Cl.
| | |
|---|---|
| *F16M 13/02* | (2006.01) |
| *H01Q 1/12* | (2006.01) |
| *A47B 13/00* | (2006.01) |
| *F16M 11/22* | (2006.01) |
| *F16M 11/38* | (2006.01) |

(52) U.S. Cl.
CPC ............ *F16M 13/02* (2013.01); *A47B 13/00* (2013.01); *F16M 11/22* (2013.01); *F16M 11/38* (2013.01); *H01Q 1/1235* (2013.01); *Y10T 29/49828* (2015.01)

(58) Field of Classification Search
CPC .... F16M 13/02; F16M 13/027; F16M 13/022; F16M 11/22; F16M 11/24; F16M 11/242; F16M 11/38; A47B 13/00; Y10T 29/49828; Y10T 29/53961; Y10T 29/53974; Y10T 29/53983; H01Q 1/1235; H01Q 1/1207; H01Q 1/1214; H01Q 1/1221; A47G 29/00; E04G 3/00

USPC ........ 428/12, 13, 14, 15, 16, 17, 18, 19, 20, 428/21, 22, 23, 24, 25, 26, 27; 248/660, 248/237, 286.1, 287.1, 298.1
See application file for complete search history.

(56) References Cited

U.S. PATENT DOCUMENTS

| | | | | |
|---|---|---|---|---|
| 1,568,758 | A * | 1/1926 | Malcolm ................. | A47G 33/12 248/172 |
| 2,574,610 | A * | 11/1951 | Aarestad ................. | A47D 7/002 280/42 |
| 2,656,532 | A * | 10/1953 | Crump ..................... | F41G 5/08 342/155 |
| 2,683,011 | A * | 7/1954 | Haggerty .............. | H01Q 1/1235 248/166 |
| 4,831,952 | A * | 5/1989 | Dulhunty ................ | B63B 21/44 114/301 |
| 5,233,809 | A * | 8/1993 | Gropper ................ | E04H 12/187 343/882 |

(Continued)

*Primary Examiner* — David Bryant
*Assistant Examiner* — Lawrence Averick
(74) *Attorney, Agent, or Firm* — Wash Park IP Ltd.; John T. Kennedy

(57) ABSTRACT

A device is provided for mounting an object to a base. The device includes a lattice having a first number of rails orientated along a first direction coupled to a second number of rails orientated along a second direction. The device includes a first region with mount holes configured to attach the object to the lattice. The device also includes a second region configured to attach to the base. The device also includes fasteners configured to rotatably couple the first number of rails to the second number of rails at intersections of the first number of rails and the second number of rails such that the device is foldable.

28 Claims, 20 Drawing Sheets

(56) References Cited

U.S. PATENT DOCUMENTS

| | | | | |
|---|---|---|---|---|
| 5,960,721 | A * | 10/1999 | Huetteman | B65D 19/0095 108/57.17 |
| 6,464,196 | B1 * | 10/2002 | Crookham | E04G 1/24 248/519 |
| D510,367 | S * | 10/2005 | Yamashita | D15/79 |
| 7,503,536 | B2 * | 3/2009 | Friederich | F16M 11/12 248/324 |
| 7,758,001 | B2 * | 7/2010 | Bouissiere | F16M 11/041 248/206.5 |
| 7,864,418 | B2 * | 1/2011 | Kuroi | F16M 11/38 160/377 |
| 7,926,130 | B2 * | 4/2011 | Nagano | A61G 7/0509 5/428 |
| 8,081,139 | B2 | 12/2011 | Schmidt et al. | |
| 9,151,069 | B2 * | 10/2015 | Bobbio | E04H 12/185 |
| 2002/0190180 | A1 * | 12/2002 | Cotterill | A47B 21/0314 248/370 |
| 2003/0089828 | A1 * | 5/2003 | Korczak | F16B 21/075 248/68.1 |
| 2003/0154673 | A1 * | 8/2003 | MacGregor | A47B 83/001 52/239 |
| 2004/0055130 | A1 * | 3/2004 | Scott | B64F 5/10 29/428 |
| 2004/0099517 | A1 * | 5/2004 | Bonn | B60Q 5/003 200/61.54 |
| 2005/0161575 | A1 * | 7/2005 | Friederich | F16M 11/12 248/519 |
| 2005/0236546 | A1 * | 10/2005 | O'Neill | F16M 11/043 248/317 |
| 2006/0087476 | A1 * | 4/2006 | Piburn | H01Q 1/1207 343/890 |
| 2006/0186301 | A1 * | 8/2006 | Dozier | F16M 11/043 248/371 |
| 2008/0061200 | A1 * | 3/2008 | Bouissiere | F16M 11/041 248/206.5 |
| 2008/0278402 | A1 * | 11/2008 | Kreitzberg | H01Q 1/1235 343/880 |
| 2009/0183664 | A1 * | 7/2009 | White, Jr. | B63B 7/04 114/61.22 |
| 2009/0302176 | A1 * | 12/2009 | Kuroi | F16M 11/38 248/176.3 |
| 2010/0101172 | A1 * | 4/2010 | Murphy | B64G 1/222 52/646 |
| 2010/0237210 | A1 * | 9/2010 | Anderson | F16M 11/04 248/274.1 |
| 2011/0073733 | A1 * | 3/2011 | Hartelius | F24J 2/5232 248/298.1 |
| 2011/0083399 | A1 | 4/2011 | Lettkeman et al. | |
| 2011/0187624 | A1 * | 8/2011 | Lettkeman | H01Q 3/02 343/882 |
| 2014/0048660 | A1 | 2/2014 | Lettkeman | |
| 2014/0123575 | A1 * | 5/2014 | Bobbio | E04H 12/185 52/108 |
| 2014/0158854 | A1 * | 6/2014 | Conrad | H01Q 1/12 248/544 |
| 2015/0159337 | A1 * | 6/2015 | Kellner | E04H 12/2215 248/156 |

* cited by examiner

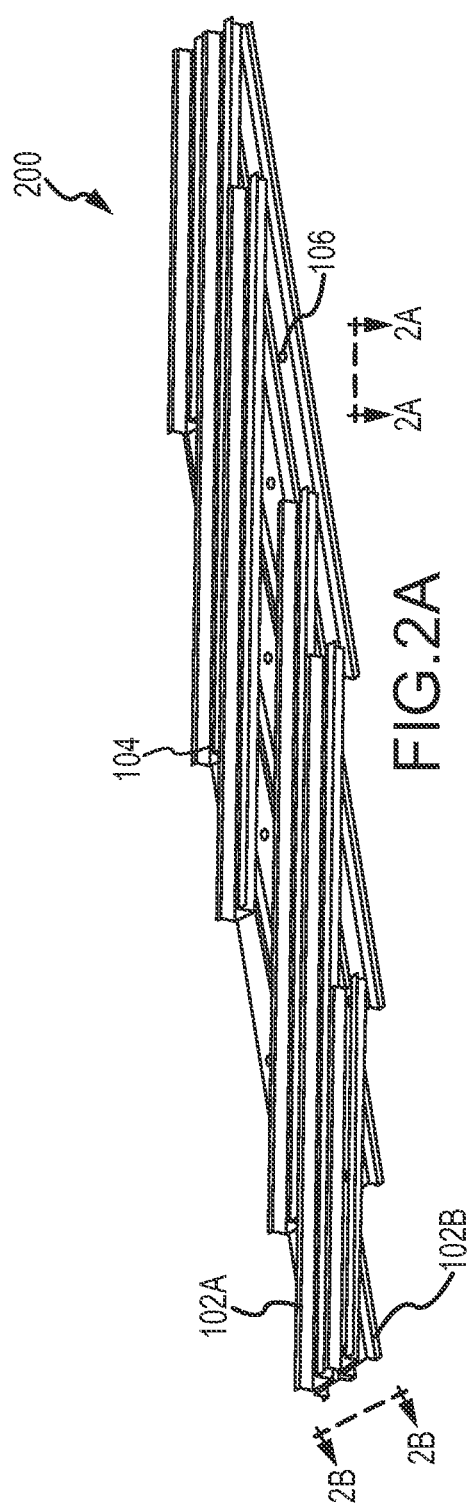
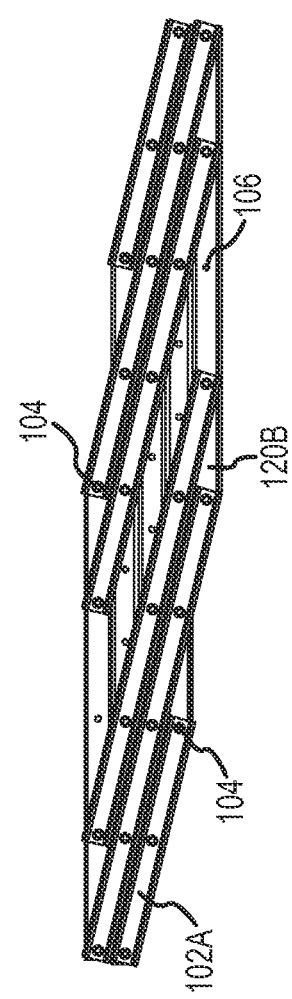
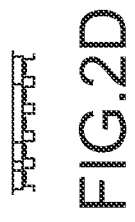

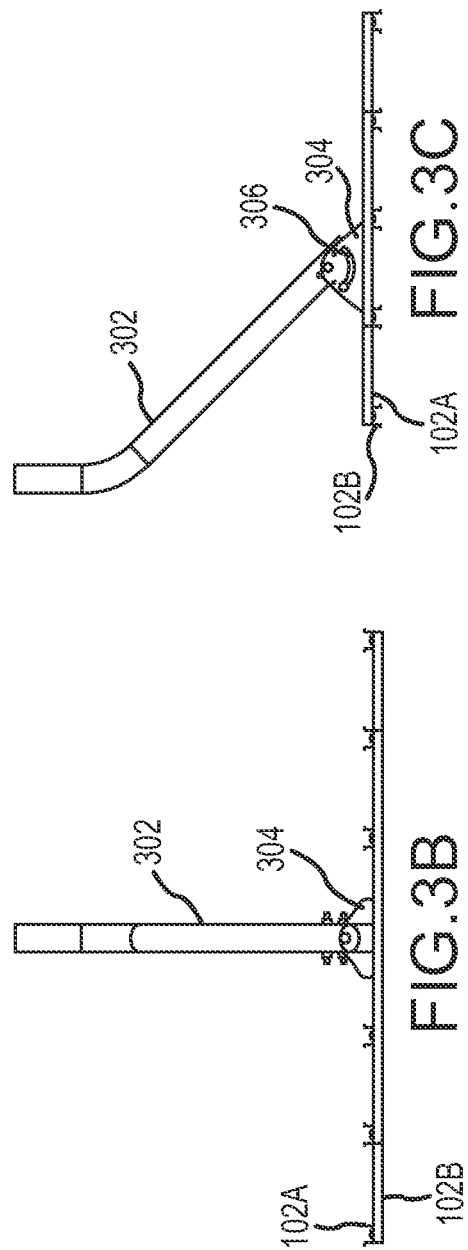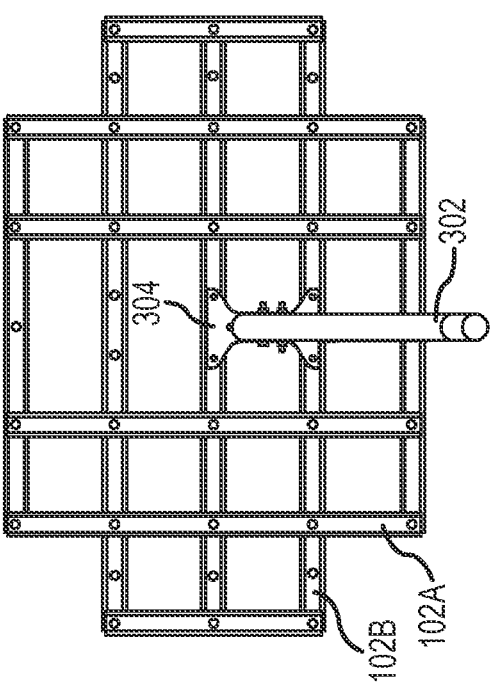

LATTICE MOUNTING DEVICE

TECHNICAL FIELD

The present invention generally relates to mounting device. More specifically, the invention relates to a lattice mounting device that firmly attaches an object to a base.

BACKGROUND

With the introduction of direct-to-home satellite broadcast television systems, such as Direct Broadcast Satellite (DBS) systems, a multitude of television programs, audio channels, and the like previously unknown with terrestrial ("over-the-air") broadcast systems was made accessible to millions of potential subscribers. One aspect of such systems that allows such wide accessibility is the use of a small (e.g., less than one meter in diameter) and inexpensive satellite antenna. To effectively employ such an antenna, a subscriber commonly provides direct line-of-sight between the antenna and the satellites of interest, and supplies a stable mounting platform or base to which the antenna is mounted, such as the exterior of the subscriber's home. The stable mounting platform helps prevent the antenna from becoming misaligned or misdirected as the result of strong winds or other meteorological conditions, which may cause disruption of the satellite signal carrying the programming.

In many cases, a subscriber may determine that a rail or similarly-configured structure conveniently located in the vicinity of the proposed location for the receiver is desirable as a mounting base for the antenna. While such a rail may provide a stable structure to which an antenna may be mounted, the subscriber may desire to attach the antenna thereto without drilling holes in the rail, or otherwise significant damage on the rail. Further, the diameter of each rail potentially utilized as an antenna mounting base may vary widely from one subscriber premises to another, thus rendering the ability to provide a single attachment structure for mounting an antenna to such a rail.

A first type of antenna mount has been disclosed in U.S. Pat. No. 8,081,139, issued on Dec. 20, 2011, by Jason S. Schmidt, David Lettkeman and Eric Bolze, entitled "Structures and Methods for Mounting an Antenna." The antenna mount includes individual three components, i.e. first, second and third components. One rail is held between the first component and the third component, and another rail is held between the second component and the third component. A foot section for mounting to an antenna is attached to the third component on an opposite side from the rails. This antenna mount allows to attach the antenna to the rails. The antenna is relatively large in size and uses more materials in fabricating the first, second, and third components and thus is relatively expensive.

A second type of antenna mount has been disclosed in U.S. Patent Application No. 20110083399, filed on Oct. 13, 2009, by David Lettkeman and Kevin S. Holle, entitled "Structures and Methods for Mounting An Object." This type of antenna mount uses a chain to mount the antenna to a rail. Although the second type of antenna mount is simpler than the first type of antenna mount, the second type of antenna mount is still relatively complicated and expensive.

A third type of antenna mount has been disclosed in U.S. patent application Ser. No. 13/968,427, filed on Aug. 16, 2013. This third type of antenna mount includes two clamp components or two clamp members, which are relatively small in size compared to the first type of antenna mount disclosed in U.S. Pat. No. 8,081,139. The smaller sizes may help reduce the use of materials and thus may reduce product cost. The third type of antenna mount may be easier for mounting as there are only two components, rather than three components as disclosed in the U.S. Pat. No. 8,081, 139.

There still remains a need to design mounting devices for attaching an antenna to withstand high wind. The present disclosure provides alternative mounting devices.

SUMMARY

Embodiments described herein may provide lattice mounting devices for mounting an antenna or similar structure to a flat base. The lattice mounting devices described herein may be configured to hold an object, such as antenna, while withstanding higher wind loads or similar strains imparted on the object. Further, various embodiments of the lattice mounting device may be configured to be collapsible for easy transportation, storage, and deployment.

In one embodiment, a device is provided for mounting an object to a base. The device includes a lattice comprising a first plurality of rails orientated along a first direction coupled to a second plurality of rails orientated along a second direction. The lattice includes a first region with a first plurality of mount holes configured to attach the object to the lattice and a second region configured to attach to the base. The device also includes a plurality of fastening devices such as rivets or nuts and bolts or screws or pins configured to rotatably couple the first plurality of rails to the second plurality of rails at intersections of the first plurality of rails and the second plurality of rails such that the device is foldable.

In some embodiments, the second direction is orthogonal to the first direction.

In some embodiments, each of the first plurality of rails has either an U-shape, I-beam shaped or rectangular tube cross-section on a first side of the lattice and a flat surface on a second opposite side of the lattice, and each of the second plurality of rails has either an U-shape, I-beam shaped or rectangular tube cross-section on the second opposite side and a flat surface on the first side.

In some embodiments, the lattice is in a two-dimensional configuration.

In some embodiments, the object comprises an antenna or a table umbrella.

In some embodiments, the base comprises a roof, a patio or a ground having various orientations.

In some embodiments, the plurality of rivets comprise bolts and nuts, screws, or pins.

In some embodiments, the second region comprises a second plurality of mounting holes on at least one of the first plurality of rails or at least one of the second plurality of rails.

In some embodiments, the second region is configured to hold ballast material within the space between the first plurality of the rails and the second plurality of rails.

In some embodiments, the ballast material comprises concrete blocks or other weighted material.

In some embodiments, the rails comprise a metal, a composite or a plastic.

In some embodiments, the device includes a grounding point onto which a grounding component such as a ground screw or ground lug may be attached to the lattice and thereby secure the lattice to the underlying surface.

In another embodiment, a method is provided for mounting an object to a base. The method includes providing a mounting device, which includes a lattice comprising a first plurality of rails orientated along a first direction coupled to a second plurality of rails orientated along a second direction. The device includes a first region having a first plurality of mount holes configured to attach the object to the device and a second region configured to attach to the base. The device includes a plurality of rivets configured to rotatably couple the first plurality of rails to the second plurality of rails at intersections of the first plurality of rails and the second plurality of rails such that the device is foldable. The method also includes attaching the device to the base through the second region of the device. The method further includes attaching the object to the device through the first plurality of mounting holes of the first region of the device.

Additional embodiments and features are set forth in part in the description that follows, and in part will become apparent to those skilled in the art upon examination of the specification or may be learned by the practice of the invention. A further understanding of the nature and advantages of the various embodiments described herein may be realized by reference to the remaining portions of the specification and the drawings, which form a part of this disclosure.

BRIEF DESCRIPTION OF THE DRAWINGS

FIG. 2A illustrates a perspective view of the device of FIG. 1A in a folding configuration in accordance with at least one embodiment of the present disclosure.

FIG. 2B is a top view of the device of FIG. 2A.

FIG. 2C is one side view of the device of FIG. 2A.

FIG. 2D is another side view of the device of FIG. 2A.

FIG. 3B is a side view of the mounting assembly of FIG. 3A.

FIG. 3C is a side view of the mounting assembly of FIG. 3A.

FIG. 3D is a top view of the mounting assembly of FIG. 3A.

DETAILED DESCRIPTION

Figure 1A:
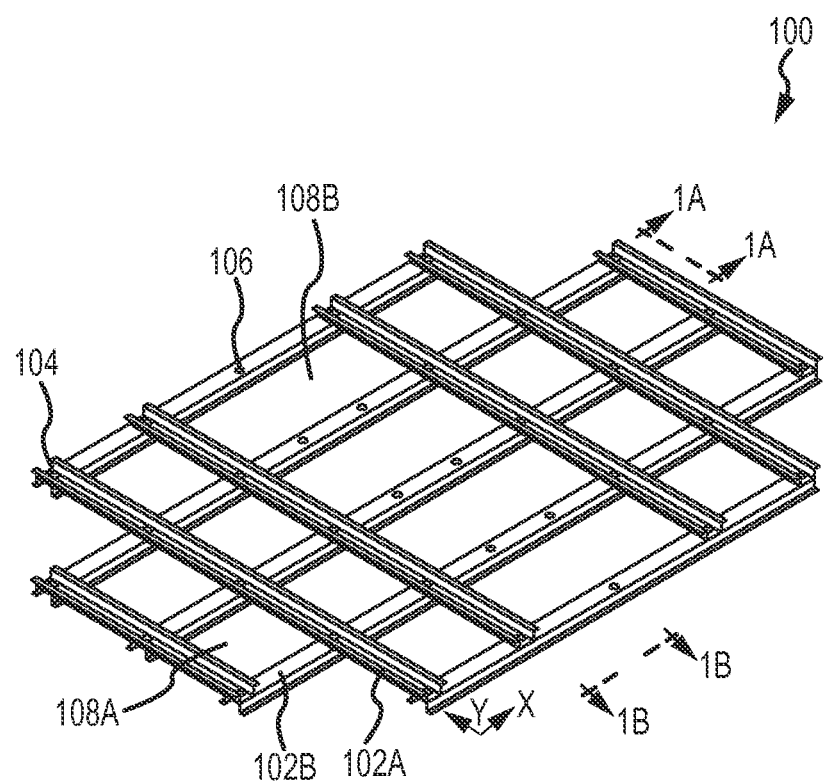
FIG. 1A illustrates a perspective view of a device in a non-folding configuration in accordance with at least one embodiment of the present disclosure.

The various embodiments of the present disclosure may be understood by reference to the following detailed description, taken in conjunction with the drawings as briefly described below. It is noted that, for purposes of illustrative clarity, certain elements in the drawings may not be drawn to scale.

The present disclosure provides embodiments of mounting devices configurable for use in mounting an object, such as an antenna, to a substantially planar base surface. The mounting devices, in at least one embodiment, may include one or more first members. The first members may be configured as rails having U-shaped, I-shaped, rectangular shaped, tube shaped or other geometric configurations. The rail members may be configured in a cross-section arrangement, including but not limited to being configured in a lattice configuration. The rail configuration, may in one or more embodiments be configured in any orientation including a flat orientation, parabolic orientation, a circular orientation, a combination of the foregoing or any other desired orientation and/or configuration. The configuration of the rails may be predicated on any of many possible factors including but not limited to environmental conditions, such as a predicted wind load, geographic conditions, such as the shape and orientation of the planar surface upon which the lattice may be deployed for usage thereof, the anticipated weight of the object to be secured by the mounting device and other factors. The rails may include one or more of various options for mounting an object (e.g., antenna, or umbrella) to the lattice including but not limited to mounting holes. In some embodiments, the rails may include mounting holes for a mast. In some embodiments, the rails may also include mounting holes for mounting to the flat base, such as roof or a patio. In some embodiments, the mounting device can be configured for use in firmly attaching the device to a surface, for example, a patio surface, by use of ballast materials (e.g., concrete blocks or metal plates) secured to the mounting device within one or more cavities provided by and between the rails. Such cavities may arise outside the object mounting area for at least one embodiment.

FIG. 1A illustrates a perspective view of a mounting device in a non-folded configuration in accordance with at least one embodiment of the present disclosure. The mounting device 100, as depicted for this embodiment, may include a number of first members, such as rails 102A, along a first orientation and a number of second members, such as rails 102B, along a second orientation. As depicted for this embodiment, rails 102A and 102B may be configured and spaced apart from each to form a two-dimensional lattice. The rails 102A may be positioned on top of the rails 102B. The rails 102B may include first mounting holes 106 for attaching an object to the mounting device 100. In other embodiments, mounting options, such as first mounting holes 106, may be included in a number of the first members, second members and/or in both the first and second members. In some embodiments, the rails 102A are oriented substantially perpendicular to the rails 102B. Other orientations, however, may be utilized for other embodiments, as desired.

Figure 1B:
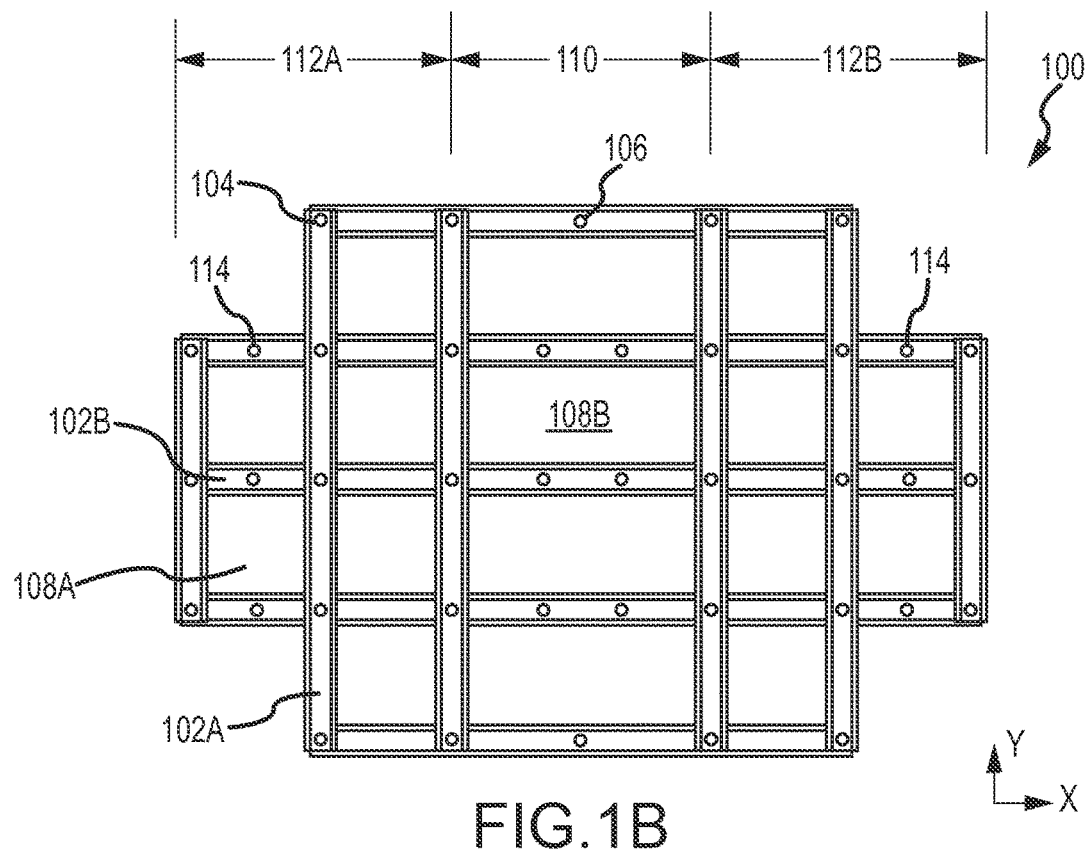
FIG. 1B is a top view of the device of FIG. 1A.

FIG. 1B is a top view of the mounting device of FIG. 1A. As shown, the mounting device 100 includes a number of rails 102A along a first orientation (e.g., a Y axis) coupled to a number of rails 1028 along a second orientation (e.g., an X axis) by a fastener 104, such as rivets, bolts and nuts, screws, pins or similar fastening devices. In at least one embodiment, the orientation of the rails 102A and 1028 may form a lattice pattern 108A or 1088 which is in a substantially square shape or a substantially rectangularshape, as shown in FIG. 18. In other embodiments the orientation of the rails 102A and 1028 may form other geometric shapes. The mounting device 100 includes a central region or portion 110 which, as shown for the embodiment depicted in FIG. 18, may form a lattice pattern 1088 in a substantially rectangular shape. The mounting device 100 may include other regions. A region, such as central region 110, may be configured to attach an object to one or more of the rails 102A and/or 102B via first mounting holes 106. The mounting device 100 may also include outer regions or portions 112A-B on one or more sides of the central portion 110. The outer portions 112A-B may include a lattice pattern 108A in a substantially square shape. The outer portions 112A-B may be configured to attach an object thereto and/or to attach the mounting device to a base, such as a roof or a patio. In at least one embodiment, the outer portions 112A-B may include a number of second mounting holes 114 on the rails 102A and/or 102B configured to attach the mounting device to a base (not shown), such as a roof or patio. In at least one embodiment, second mounting holes 114 may be utilized to attach the mounting device 100 to a base oriented on other than a flat plane, including for example, a roof. The mounting device 100 may be attached to a base and oriented to withstand high winds by distributing the wind load impending upon any object attached to the mounting device over the entire surface of the mounting device.

In some embodiments, the outer portions 112A-B may hold weight blocks within and/or upon lattice pattern 108A. For example, the ballast materials may be concrete blocks. Other materials may be used as ballast materials, as desired for any given implementation of any of the embodiments discussed herein. A minimum weight of the ballast materials may be required to hold an object such as an antenna or grill or table umbrella in strong wind. In at least one embodiment 180 lbs. of ballast material may be utilized to hold an object attached to the mounting base in a desired orientation. The lattice pattern 108A can be configured to hold commercial concrete blocks, ballasting plates or similar materials such that the mounting device can be firmly attached to the flat base, such as patio or ground or roof.

Figure 1C:
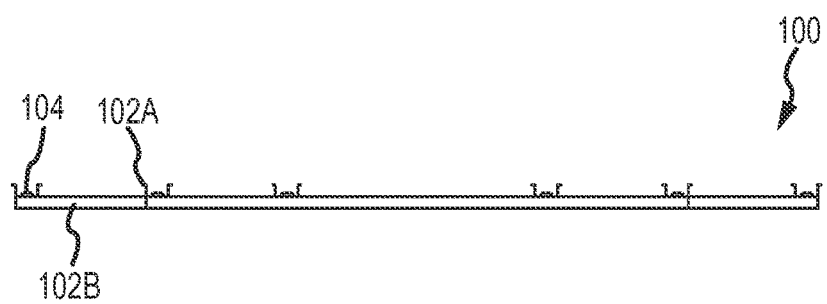
FIG. 1C is one side view of the device of FIG. 1A.

FIG. 1C is one side view of the mounting device of FIG. 1A. As shown, the rails 102A can be designed to have a U-shaped cross-section with a substantially flat bottom and two sidewalls. The U-shaped rail configuration may be used to increase the torsional strength of any rails. The sidewalls of the rails 102A may extend outwardly from the lattice, for example, upward as shown in FIG. 1C. The rail sidewalls may extend any desired height and in at least one embodiment exceed the height of the fasteners 104. It will be appreciated by those skilled in the art that the shape, size, material utilized, thickness and other properties of one or more of the rails may vary. For example, rails located near the center portion of the device may utilize rails having properties different than those of rails located near an exterior portion of the device and vice versa. In at least one embodiment, rails 102A may rotatably coupled to rails 1026 by fasteners 104. In other embodiments, in any given rail may or may not be rotatably coupled to any other rail.

Figure 1D:
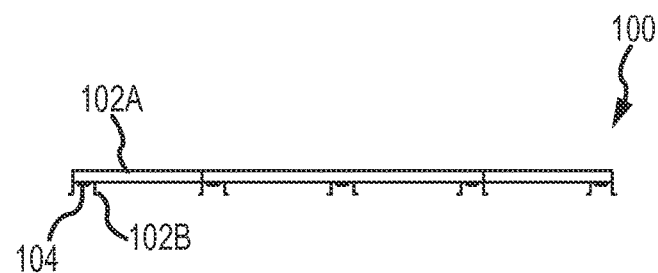
FIG. 1D is another side view of the device of FIG. 1A.

FIG. 1D is another side view of the mounting device of FIG. 1A. As shown, the rails 102B can also be configured to have a U-shaped cross-section with a substantially flat bottom and two sidewalls. The sidewalls of the U-shaped rails 1026 may extend outwardly to exceed the height of the rivets 104, for example, downward as shown in FIG. 1D. The flat bottoms of the U-shaped rails 102A may be attached to the flat bottoms of the U-shaped rails 1026. It will be appreciated by those skilled in the art that the shape, size, material utilized, thickness and other properties of one or more of the rails 1026 may vary.

In a particular embodiment, mounting device 100 includes six top rails 102A and five bottom rails 102B. Lattice pattern 108A is a square with a side length of about 8 inches. Lattice pattern 108B is a rectangle with a length of 16 inches and a width of 8 inches. Lattice mounting device 100 is about 32 inches wide and 48 inches long. It will be appreciated by those skilled in the art that the dimensions, number of rails, and the configuration of the rails may vary.

For at least one embodiment, the mounting device can be configured into an unfolded configuration to withstand higher wind events by providing a relatively large size over which to distribute the load. The mounting device may also be configured to be easily installed on a flat base by including fasteners 114 about which one or more of rails 102A may freely rotate relative to one or more rails 102B. The lattice mounting device may also be configured, in accordance with at least one embodiment, to be self-locking after installation. Self-locking of the mounting device may be accomplished by including in and/or attached to the mounting device an attached or detached swivel, latch, push-on or other type of a clip or pin or set screw that secures, inhibits and/or prevents the rotation of the first railing 102A relative to the second railing 102B.

To reduce the size of the lattice mounting device for easy transportation or shipping, the lattice mounting device may be configured to be collapsible.

FIG. 2A illustrates a perspective view of mounting device of FIG. 1A in a folded configuration in accordance with at least one embodiment of the present disclosure. Mounting device 200 depicts a folded configuration of mounting device 100. As shown, the angle between rails 102A and rails 102B is smaller than 90°.

FIG. 2B is a top view of the mounting device of FIG. 2A. FIG. 2B also depicts an exemplary dimension for the folding mounting device having a length of 49 inches and a width of 7.2 inches. Other dimensions of mounting devices in folded and unfolded configurations may be provided in accordance with at least one embodiment of the present disclosure.

FIG. 2C is one side view of the mounting device of FIG. 2A as shown by arrows 2A. FIG. 2C depicts an example height of the lattice mount 200 of 1.125 inches for at least one embodiment of the present disclosure. Generally, the dimensions of the rails may vary with the materials, such as metal, composite or plastic. For metal railing, example dimensions of U shape, I-shape and rectangular tube dimensions may be between 0.75 inches by 0.75 inches and 2 inches by 2 inches and variations thereof, with a thickness of 0.0239 inches to 0.1345 inches depending on metal grade and type of metal. However, other dimensions of rails and materials may vary based upon the folded and/or unfolded size of any given mounting device and the loads intended to be supported thereby in given locational and/or environmental conditions.

The rails 102A and 102B may have a minimum stiffness and a minimum strength to withstand a high wind to meet municipal or city or state building codes.

FIG. 2D is another side view of the mounting device of FIG. 2A as shown by arrows 2B. As shown, for at least one embodiment the mounting device may provide a very slim profile (as seen from the perspective of arrows 2B) when in an folded configuration. A person of ordinary skill should appreciate that such low, unfolded profile may facilitate storage and transportation of the mounting device.

Figure 3A:
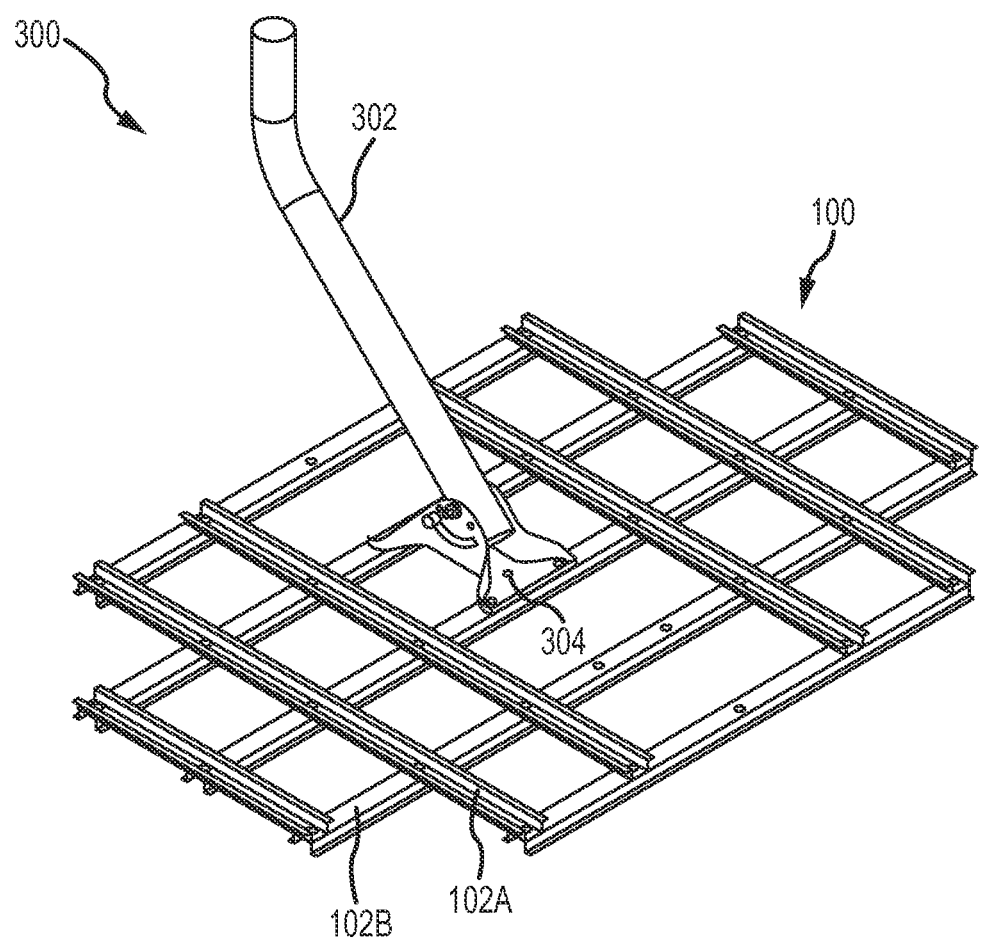
FIG. 3A is a perspective view of a mounting assembly having a mast foot configuration in accordance with at least one embodiment of the present disclosure.

The mounting device 100 may be used to hold any type of load, including for example, an antenna. FIG. 3A is a perspective view of the mount assembly with a mast foot configuration in accordance with one or more embodiments of the present disclosure. As shown, a mast foot 300 includes a base portion 304 configured to attach to the lattice mount 100. The mast foot 300 also includes an arm portion 302 configured to hold an antenna or other device intended to extend from the mast foot 300.

FIG. 3B is one side view of the mount assembly with the mast foot configuration of FIG. 3A. In this side view, the mast foot 300 is in the middle of the mount 100, and is bridged between rails 102B and mounted onto two rails 102B. The mast foot 300 is located between two rails 102A that are perpendicular to rails 102B in an expanded configuration.

FIG. 3C is another side view of the mount assembly with the mast foot configuration of FIG. 3A. The base portion 304 is attached to two rails as shown in FIG. 3C. The arm portion 302 is connected to the base portion 304 at an angle from the mount. This angle may be adjusted along a slot 306 of the base portion 304 and can be fixed at any position in the slot 306.

FIG. 3D is a top view of the mount assembly with the mast foot configuration of FIG. 3A. As shown, the arm portion 302 extends perpendicularly from rail 102B toward one side of the mount.

Figure 4A:
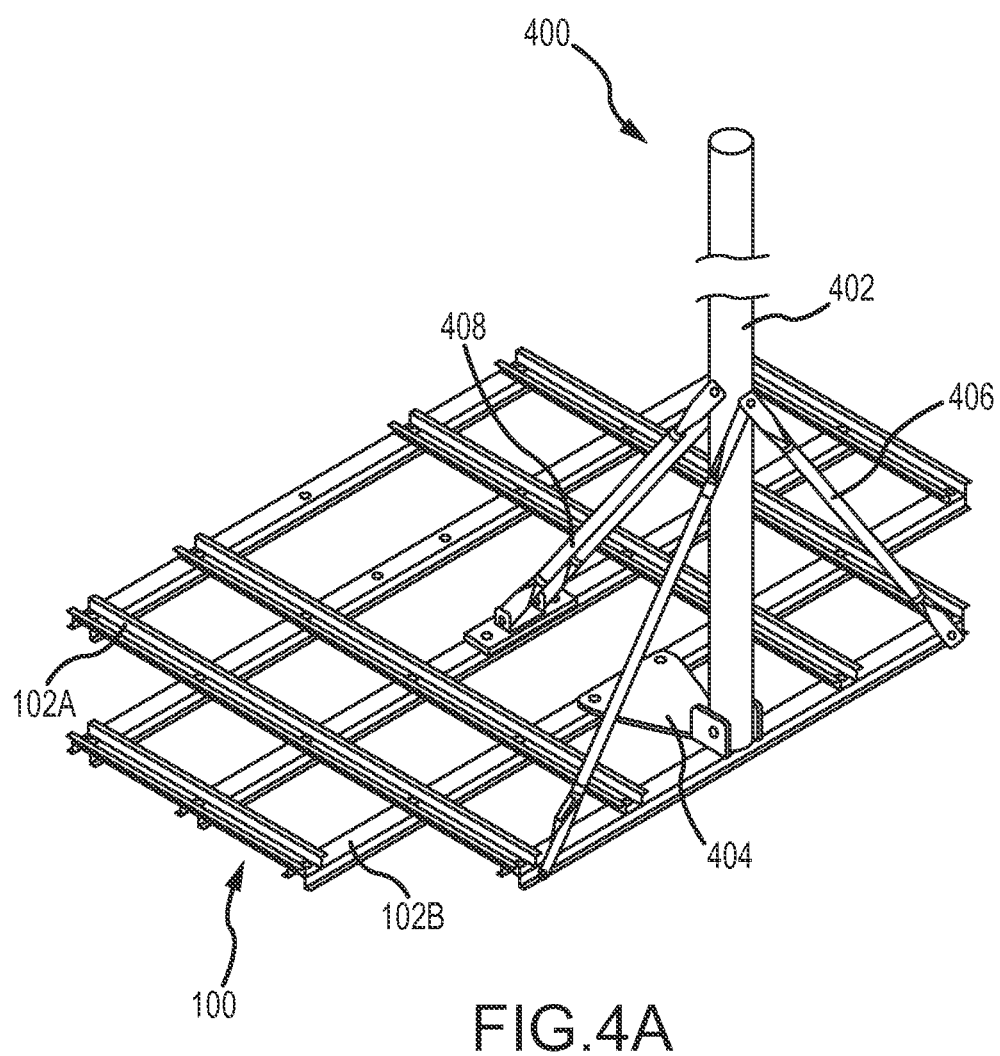
FIG. 4A is a perspective view of a mounting assembly having a patio configuration in accordance with at least embodiment of the present disclosure.

The mount may be used to position and hold the position of a device (e.g., an antenna) relative to a surface (e.g., a patio). FIG. 4A is a perspective view of the mount assembly with a patio configuration in accordance with at least one embodiment of the present disclosure. The mount assembly with a patio configuration 400 may include a post 402 attached to a base 404 and two single supporters 406 and one double supporter 408. The post 402 may be configured to hold a large umbrella or the like. The base 404 may be bridged between two rails 102B and attached to two rails 102B. The single supporters 406 may also be attached to the rail 102B on the edge of the mount. The double supporter 408 may be attached to the rail 102B, for example, near the middle of the mount. The attachments of the supporters 406 and 408 may be in a triangle configuration on the mount to hold the post 402. It is to be appreciated that other configurations of a post 402, supporters 406 and/or double supporters 408 may be used in any desired implementation of an embodiment of the present disclosure. For example, two or more double supports 408 may be used in lieu of and/or in addition to one or more of the single supporters 406.

Figure 4C:
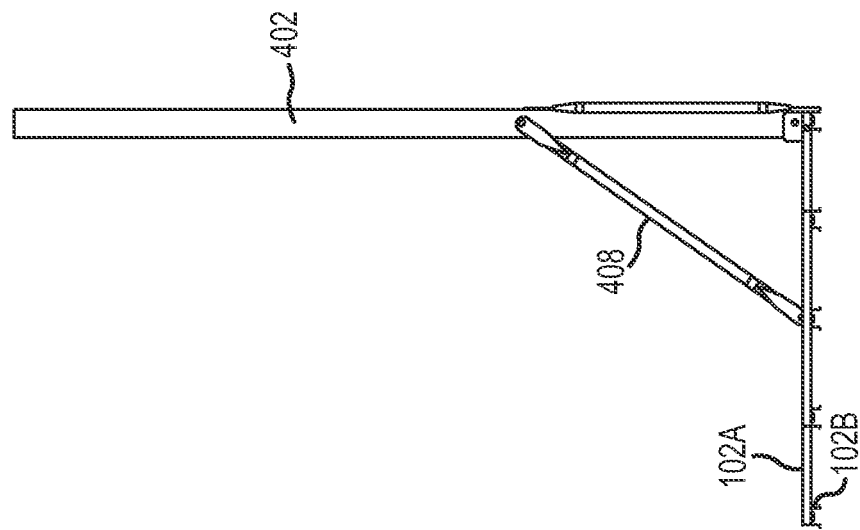
FIG. 4C is a side view of the mounting assembly of FIG. 4A.
Figure 4B:
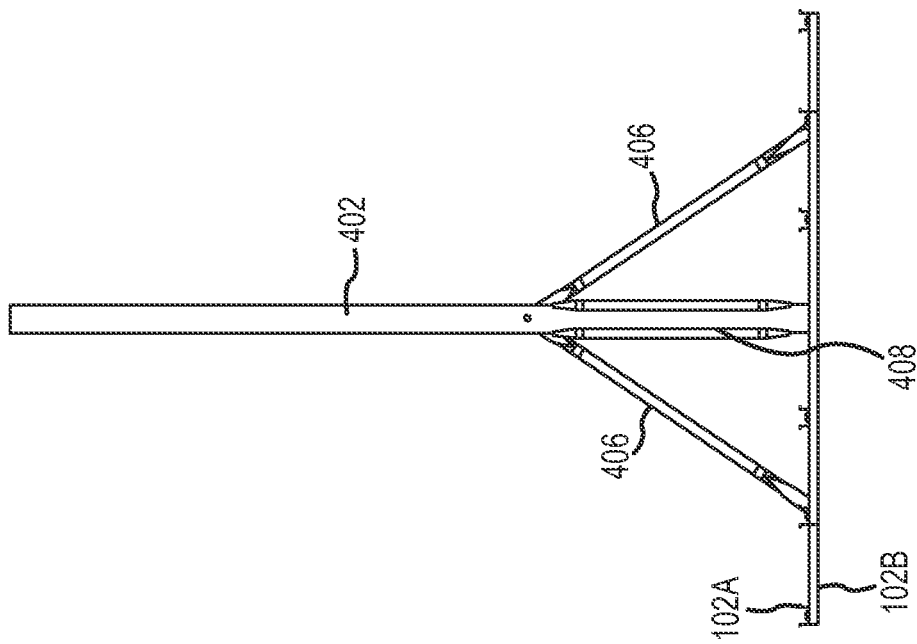
FIG. 4B is a side view of the mounting assembly of FIG. 4A.

FIG. 4B is one side view of the mount assembly with the patio configuration of FIG. 4A. In this side view, the patio configuration 400 is attached to the middle of the mount 100, and located between two rails 102A. The post 402 is held vertically by single supporters 406 that are angled from the mount. The angles may vary with the rails which the supporters 406 are attached to and the location of the post 402 where the supporters 406 are attached, depending upon the design criteria. With the additional support from the supporters 406, the mount desirably is configured to withstand high wind loads.

FIG. 4C is another side view of the mount assembly with the patio configuration of FIG. 4A. The post 402 is connected to the base 404, and to be held vertically by single supporters 406 and double supporter 408. In this view, the double supporter 408 is angled from the mount on the ground.

Figure 4D:
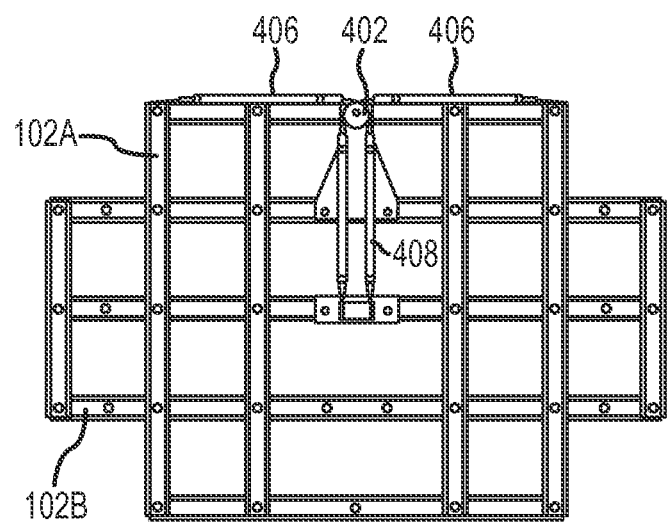
FIG. 4D is a top view of the mounting assembly of FIG. 4A.

FIG. 4D is a top view of the mount assembly with the patio configuration of FIG. 4A. Note that double supporter 408 includes two arms which are similar to that of single supporter 406.

Figure 5A:
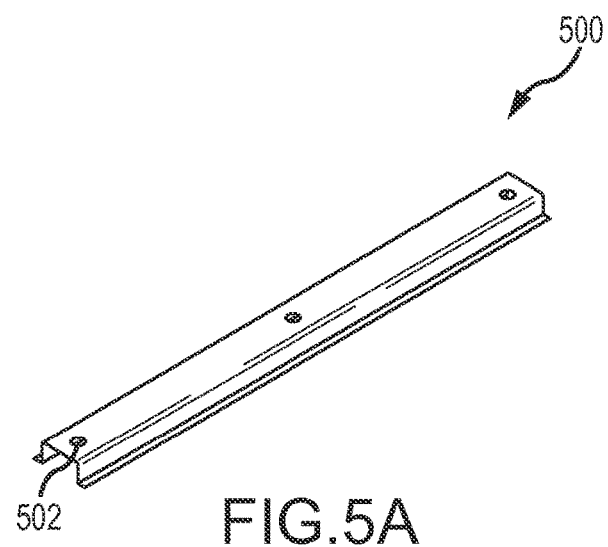
FIG. 5A is a perspective view of a rail in accordance with at least one embodiment of the present disclosure.
Figure 5B:
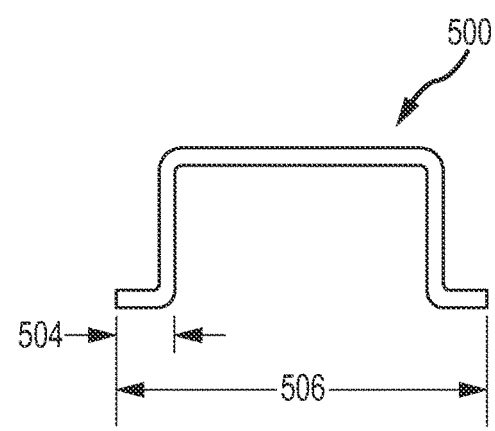
FIG. 5B is a side view of the rail of FIG. 5A.
Figure 5C:
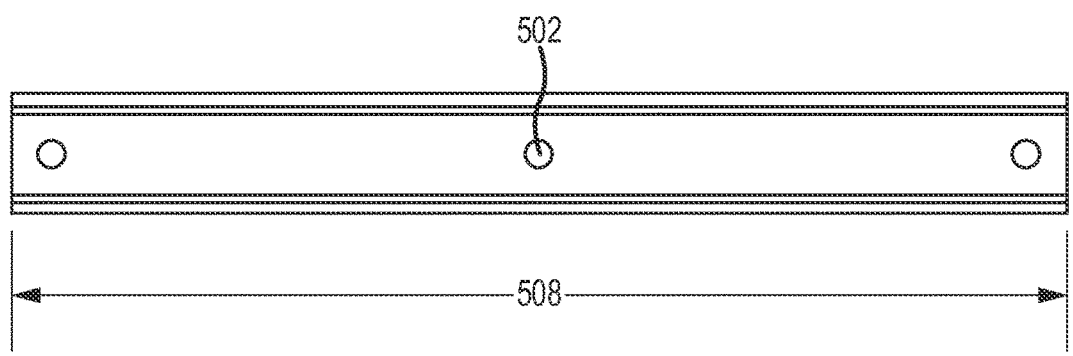
FIG. 5C is a top view of the rail of FIG. 5A.

The rails 102A and 102B in the mount 100 may have various configurations. FIGS. 5A-5C illustrate a first configuration for the rail. FIG. 5A is a perspective view of a rail in accordance with at least one embodiment of the present disclosure. As shown, the rail 500 has three holes and a U-shape. This may be used as a shorter rail 102A shown in FIG. 1A.

FIG. 5B is a side view of the rail of FIG. 5A. The U-shape rail 500 may have a height of about 0.563 inches, and a width 506 of about 1.367 inches including a rail extension 504 of about 0.222 inches. The rail extension extends outward from the ends of the U-shape side walls. The rail 500 may have a thickness of about 0.060 inches. FIG. 5C is a top view of the rail of FIG. 5A. The holes 502 may have a diameter of about 0.3125 inches. In a particular embodiment, the rail 500 may have a length 508 of 13 inches.

Figure 6A:
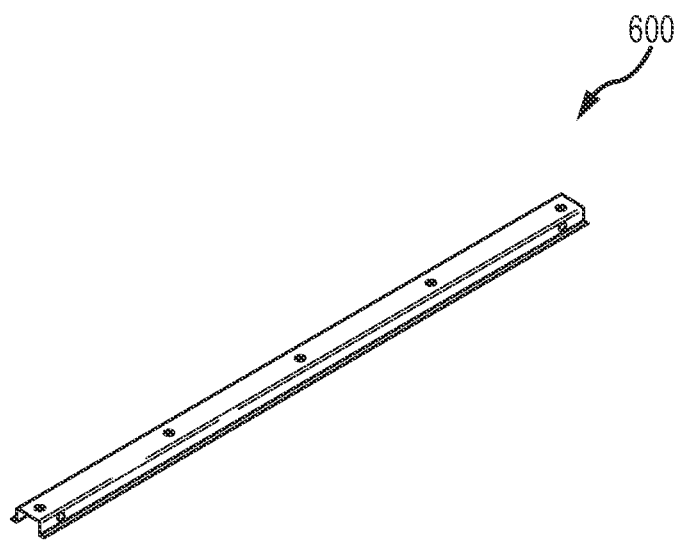
FIG. 6A is a perspective view of a rail in accordance with at least one embodiment of the present disclosure.
Figure 6B:
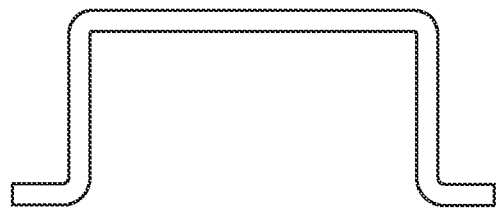
FIG. 6B is a side view of the rail of FIG. 6A.
Figure 6C:
FIG. 6C is a top view of the rail of FIG. 6A.

FIGS. 6A-6C illustrate a second configuration for a rail. FIG. 6A is a perspective view of a rail in accordance with at least one embodiment of the present disclosure. FIG. 6B is a side view of the rail of FIG. 6A. FIG. 6C is a top view of the rail of FIG. 6A. As shown, the second rail 600 has five through-holes and may have the same U-shape as the first configuration of the first rail 500. The five holes may be spaced evenly on the rail 600 as illustrated. This may be used as a longer rail 102A, or shorter rail 102B shown in FIG. 1A.

In a particular embodiment, the second rail 600 may be 25 inches long.

Figure 7A:
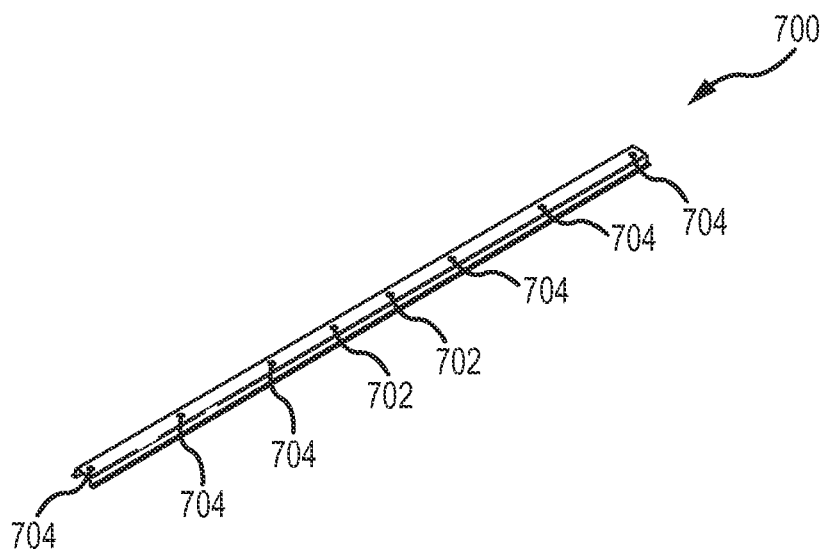
FIG. 7A is a perspective view of a rail in accordance with at least one embodiment of the present disclosure.
Figure 7B:
FIG. 7B is a side view of the rail of FIG. 7A.
Figure 7C:
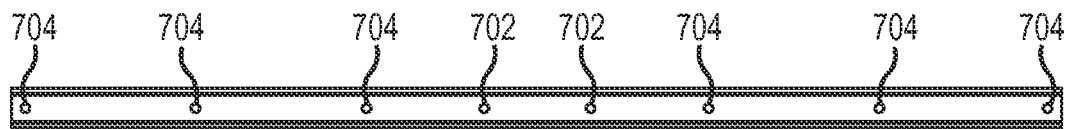
FIG. 7C is a top view of the rail of FIG. 7A.

FIGS. 7A-7C illustrate a third configuration for a rail. FIG. 7A is a perspective view of a rail in accordance with at least one embodiment of the present disclosure. FIG. 7B is a side view of the rail of FIG. 7A. FIG. 7C is a top view of the rail of FIG. 7A. As shown, the third rail 700 has six through-holes 704 for rail mount and may have the same U-shape as the first and second configurations. This rail may be used as a longer rail 102B, as shown in FIG. 1A. The holes 704 are arranged outside the center portion where two through-holes 702 are located.

The rail 700 also includes two through-holes 702 for mounting the mast foot 300 or patio configuration 400, for example, mounting the base portion 304 of the mast foot 300 as shown in FIG. 3 or mounting the supporter 408 or the base 404 of the patio configuration 400 as shown in FIG. 4A. In a particular embodiment, the third rail 700 may be 37 inches long.

It is to be appreciated that other rail configurations may be used in a mount as desired for any particular implementation thereof. Further, the rail configurations utilized for any given mount may vary with one or more rails being of a first configuration while one or more of the remaining rails being of a second, third or other configuration.

Figure 8A:
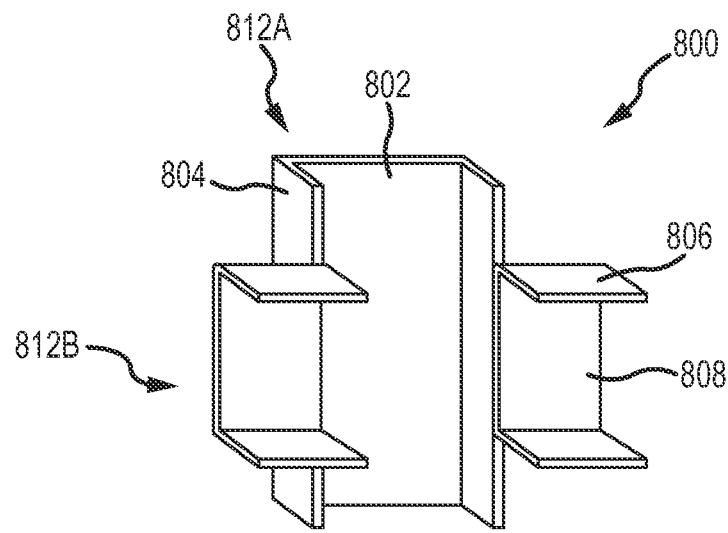
FIG. 8A is a perspective view of a push-on clip in accordance with at least one embodiment of the present disclosure.

Upon installation of the mount assembly, the rails 102A and 102B may be locked by a push-on clip. FIG. 8A is a perspective view of a push-on clip in accordance with at least one embodiment of the present disclosure. A push-on clip 800 may include a vertical U-shape portion crossed 812A and connected with a horizontal U-shape portion 812B. The vertical U-shape portion 812A and the horizontal U-shape portion 812B may be configured to attach to the rails 102A and 102B that are crossed over each other at about 90° in an expanded configuration or installation configuration. Clips may also be configured to attach to rails that cross or intersect at other angles. The vertical U-shape portion 812A may include two vertical sidewalls 804 connected to a vertical wall 802. The two vertical sidewalls 804 may configured at any orientation and in at least one embodiment may be configured to be substantially perpendicular to the vertical wall 802 and spaced by wall 802. The horizontal U-shape portion 812B may include horizontal sidewalls 806 connected to a horizontal wall 808. The horizontal sidewalls may be, in at least one embodiment, substantially perpendicular to the horizontal wall 808 and separated by the horizontal wall 808.

Figure 8B:
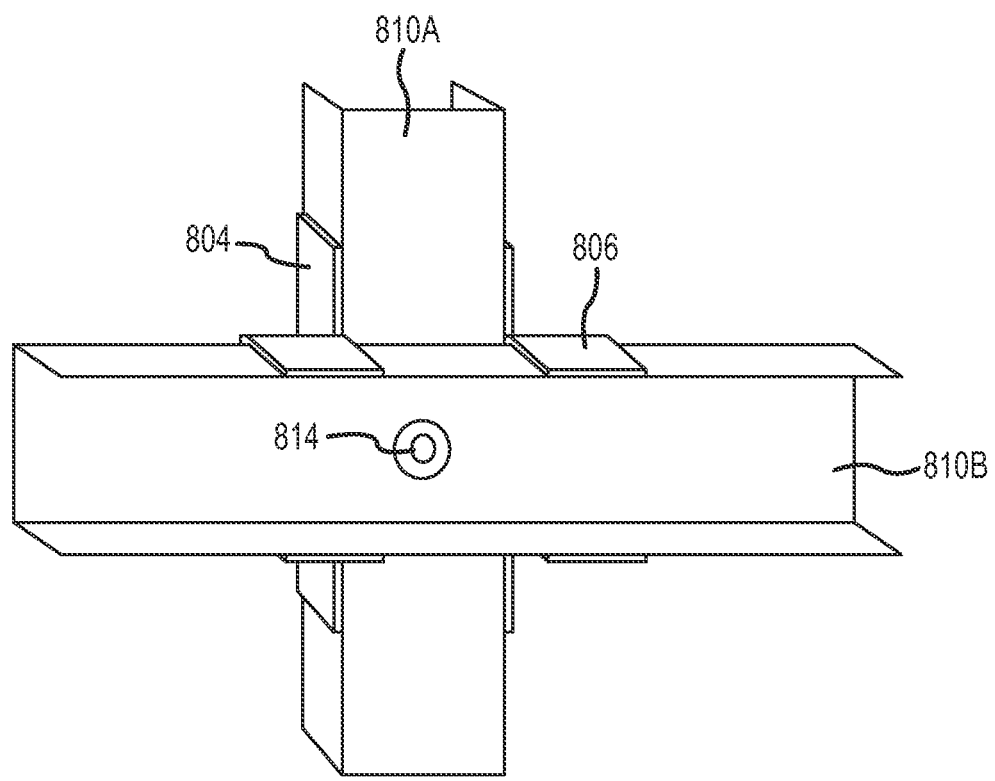
FIG. 8B is a perspective view of the push-on clip of FIG. 8A as configured on two rails of a mounting device in accordance with at least one embodiment of the present disclosure.

FIG. 8B is a perspective view of the push-on clip of FIG. 8A on the rails in accordance with at least one embodiment of the present disclosure. As shown, the push-on clip 800 has been fastened to the rails by being pushed onto the rails 810A-B from the back. As positioned and shown, the clip locks the rails 810A-B in the position and orientation desired. Other clips may be provided to other rails to correspondingly lock such rails in a desired orientation. Fastener 814 couples rails 810A to rail 810B.

Figure 9A:
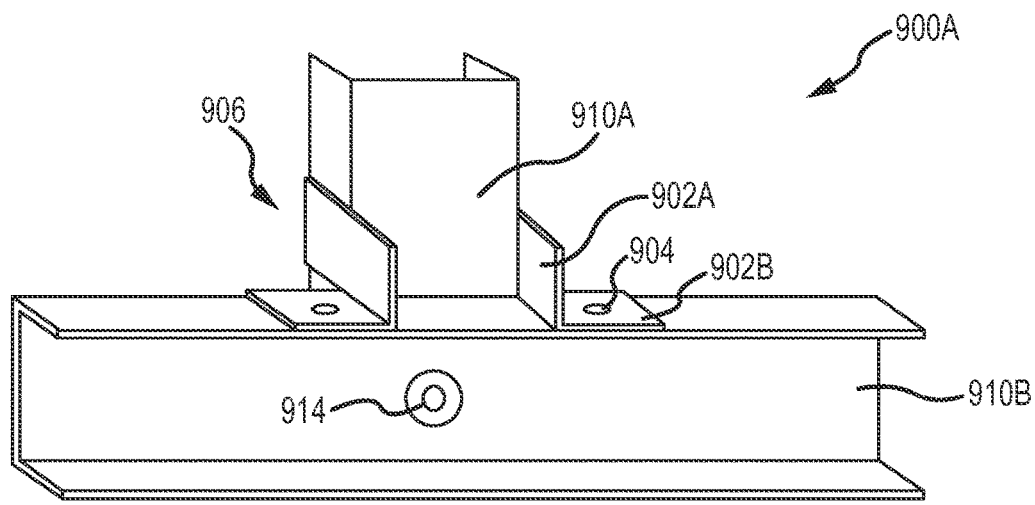
FIG. 9A is a front perspective view of a swivel clip as configured on two rails of a mounting device in accordance with at least one embodiment of the present disclosure.
Figure 9B:
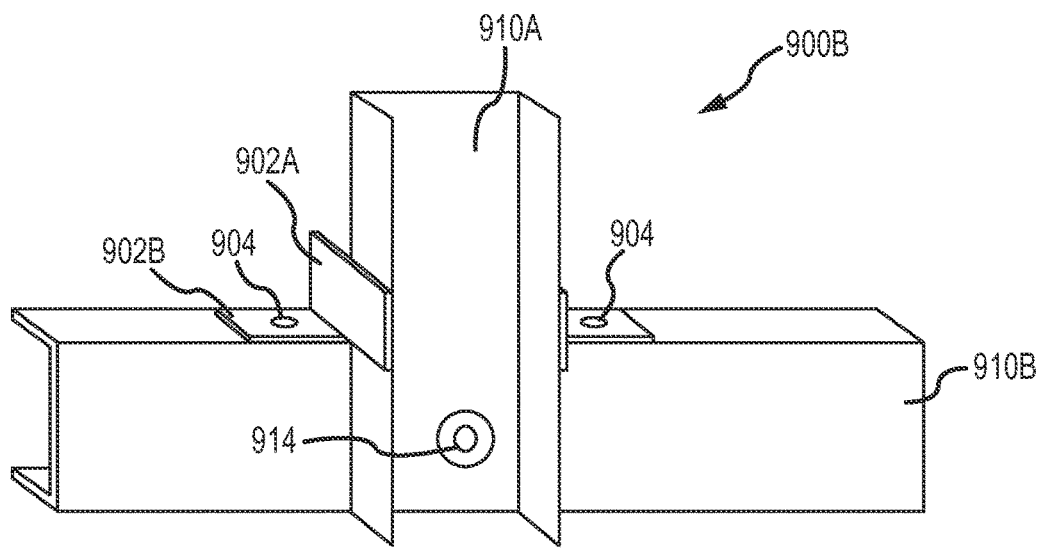
FIG. 9B is a back perspective view of the swivel clip of FIG. 9A.

In at least one embodiment, the rails may be locked by a swivel clip upon installation. FIG. 9A is a front perspective view of assembled rails locked by a swivel clip in accordance with at least one embodiment of the present disclosure. Assembly 900A includes a vertical rail 910A and a horizontal rail 910B locked by a swivel clip 906. As shown, the swivel clip 906 may include two L-shape portions. Each L-shape portion may be an integrated L-shape structure including a vertical side wall 902A connected to a horizontal base 902B. The horizontal base 902B may include a mounting through-hole 904 for a fastener to fix the swivel clip 906 to the horizontal rail. Two L-shape portions may be positioned such that sidewalls 902 are on opposite sides of vertical rail 910A. One advantage of the swivel clip is that the swivel clip may be provided as an integrated component and can lock the mount automatically after fully opening the mount. FIG. 9B is a back perspective view of the swivel clip of FIG. 9A.

Figure 10A:
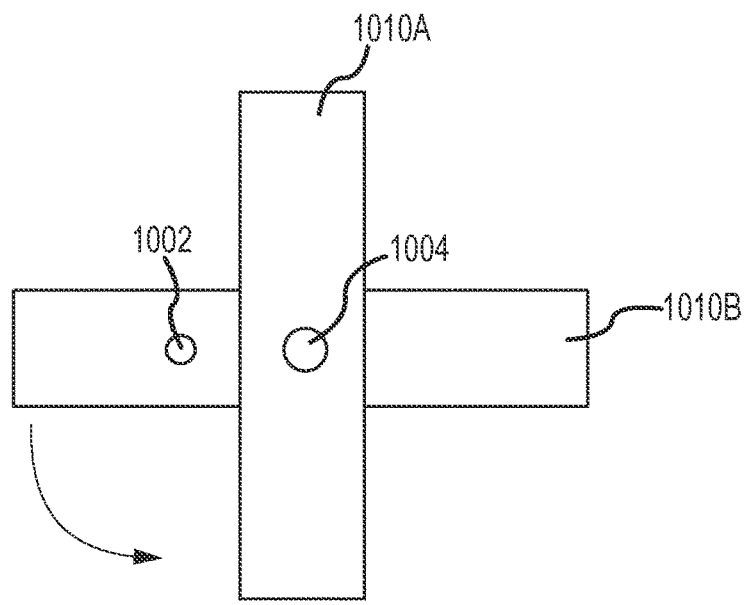
FIG. 10A is a top view of a locking clip configured on two rails in an unlocked orientation in accordance with at least one embodiment of the present disclosure.

The rails 102A and 102B may also be locked by a locking clip including a fastener. FIG. 10A is a top view of assembled two rails prior to locking by a locking clip in accordance with at least one embodiment of the present disclosure. As shown, a first rail 1010A is substantially perpendicular to a second rail 1010B. The first rail 1010A may be fastened to the second rail 1010B by a fastener 1004 through a through-hole (not shown) of each of the rails 1010A-B. The second rail 101B may include a pin hole 1002 at a distance from the fastener 1004. Fastener 914 couples rail 101A to rail 1010B.

Figure 10B:
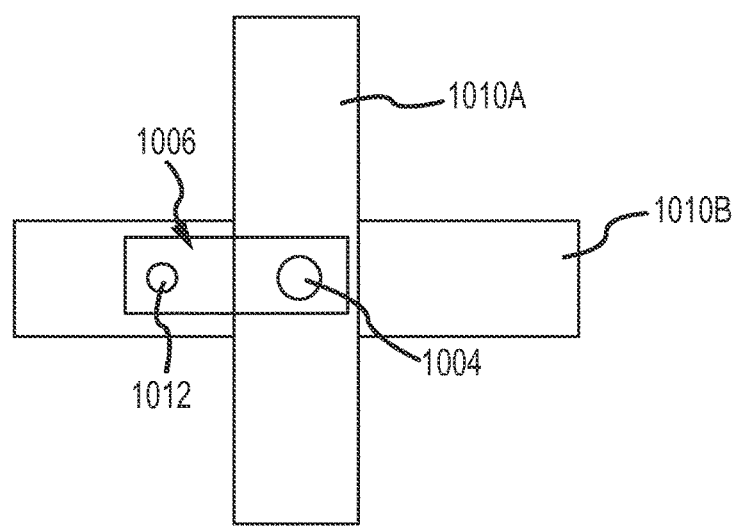
FIG. 10B is a top view of the locking clip of FIG. 10A.

FIG. 10B is a top view of two assembled rails locked by a locking clip in accordance with at least one embodiment of the present disclosure. As shown, a locking clip 1006 may include a locking plate 1008 that overlaps with a portion of one rail 1010A and a portion of another rail 1010B. The locking plate 1008 may be sized not to exceed the width of the rail 1010B. The locking plate 1008 may include a through-hole at a distance from the fastener 1004. The locking clip 1006 may include a locking pin 1012, which can be inserted into the pin hole 1002 of the rail 1010B to lock the rails 1010A-B. The through-hole of the locking plate 1008 may be matched to the locking pin 1012.

Figure 10C:
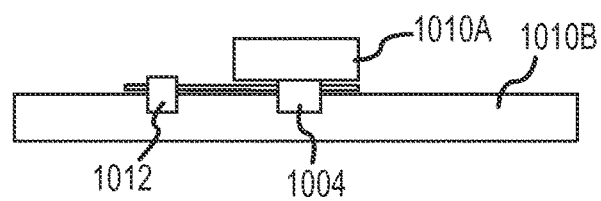
FIG. 10C is a side view of the locking clip of FIG. 10A as the locking clip is configured on two rails and in a locking orientation in accordance with at least one embodiment of the present disclosure.

FIG. 10C is a side view of the two assembled rails locked by the locking clip of FIG. 10B. As shown, the fastener 1004 may hold the two rails 1010A and 1010B and the locking plate 1008. The locking pin 1012 may lock the rails 1010A-B and the locking plate 1008 in a fixed position.

Figure 11:
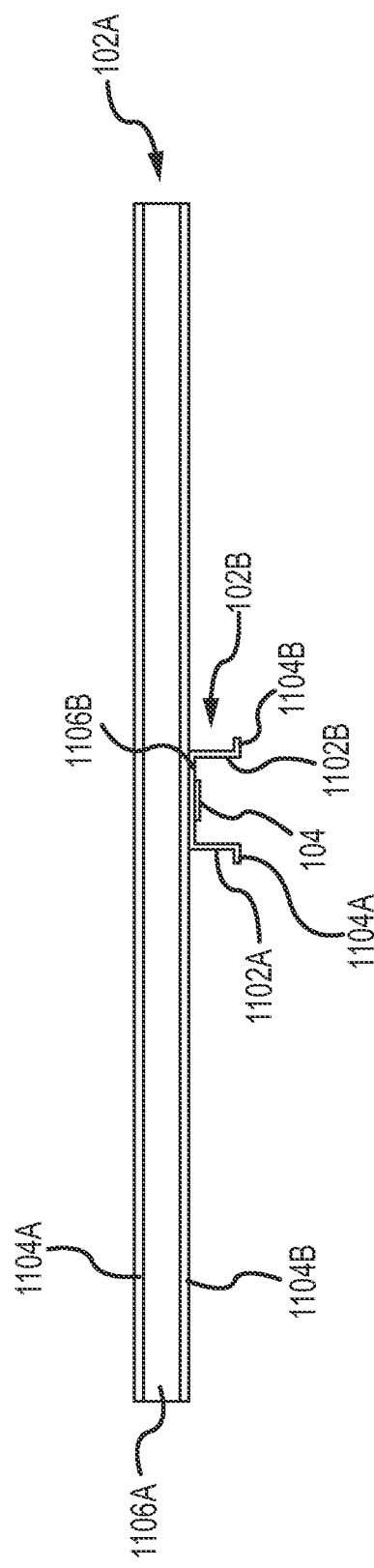
FIG. 11 is a side view of a mounting device having at least two rails secured to each other using a rivet assembly in accordance with at least one embodiment of the present disclosure.

In at least one embodiment, a rivet may be used to control how much force is required to open up the mount by hand. FIG. 11 is a top view of assembled two rails with a lattice mount rivet in accordance with at least one embodiment of the present disclosure. As shown, two rails 102A and 102B may be positioned substantially perpendicular to each other and assembled by a lattice mount rivet 1108, such as a fastener. The rail 102B may include a base wall 1106B connected to two opposite side walls 1102A-B. The rail 102B may also include two extensions 1104A-B from side walls 1102A-B, respectively. The extensions 1104A-B increase the surface areas that contact a floor or a base. The rail 102A may include a base wall 1106A connected to two opposite side walls (not shown), which may have two extensions 1104A-B. As shown, a washer may be placed between two rails 102A and 102B, for example, a nylon or rubber washer. A washer may also be placed between the fastener 1108 and rail 102B.

In alternative embodiments, the rails 102A and 102B may be locked by a rivet assembly, rather than the clips, such as push-on clip, swivel clip, locking clip, as shown in FIGS. 8A-8B, 9A-9B, and 10A-10B. For example, the rivet assembly may include a rivet 104 and a locking mechanism.

Figure 12A:
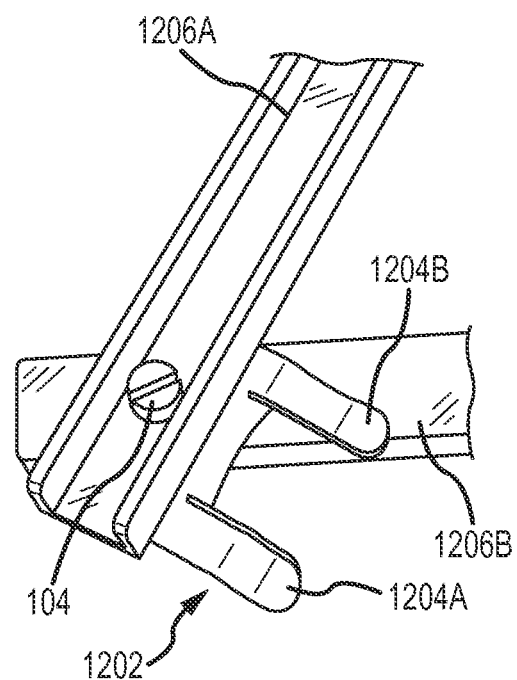
FIG. 12A is a top perspective view of a mounting device wherein two rails of the device are secured to each other using a rivet assembly and are depicted in a first, unlocking orientation in accordance with at least one embodiment of the present disclosure.

FIG. 12A is a top perspective view of two rails in an unlocking configuration by a rivet assembly in accordance with at least one embodiment of the present disclosure. As shown, a locking mechanism 1202 may include two arms 1204A-B extending from a base plate. The two arms 1204A-B may be spaced to fit to a rail. The rivet 104 assembles the rails 1206A-B with the locking mechanism 1202 sandwiched between the rails 1206A-B.

Figure 12B:
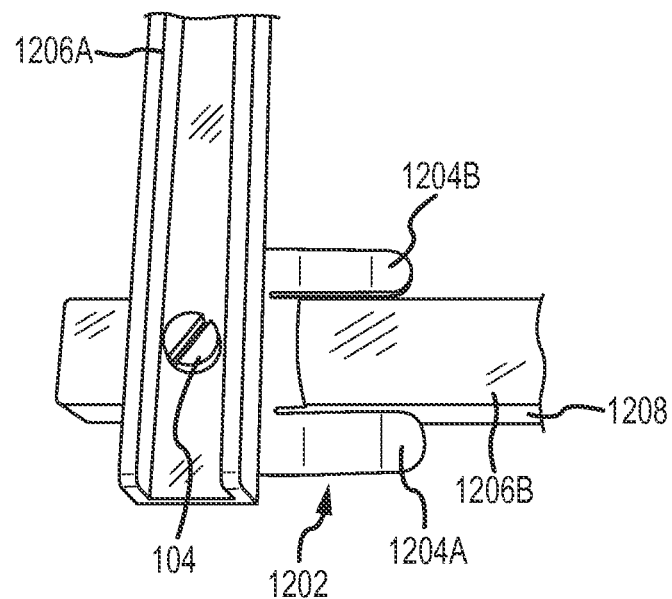
FIG. 12B is a top perspective view of the mounting device of FIG. 12A depicted in a second locking orientation in accordance with at least one embodiment of the present disclosure.

FIG. 12B is a top perspective view of two rails in a locking configuration by the rivet assembly in accordance with at least one embodiment of the present disclosure. As shown, the two arms 1204 of the locking mechanism 1202 may be positioned against the opposite sides of the rail 1206B. Rail 1206A may be positioned substantially perpendicular to rail 1206B in an expanded configuration.

Figure 12C:
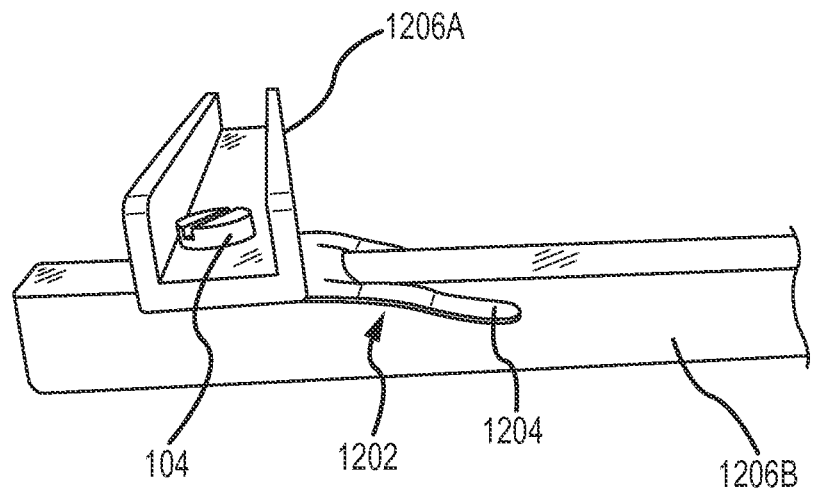
FIG. 12C is a side perspective view of the mounting device of FIG. 12B in accordance with at least one embodiment of the present disclosure.

FIG. 12C is a side perspective view of the rails of FIG. 12B in the locking configuration. The locking mechanism 1202 is sandwiched between the two rails 1206A and 1206B.

Figure 12D:
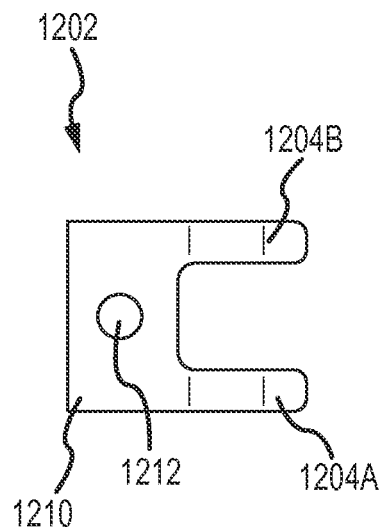
FIG. 12D is a top view of a locking mechanism configured for use with the mounting device of FIG. 12A in accordance with at least one embodiment of the present disclosure.

FIG. 12D is a top view of a locking mechanism configured for use with the mounting device of FIG. 12A in accordance with at least one embodiment of the present disclosure. As shown, the locking mechanism 1202 may include a base plate 1210 connected to two arms 1204A-B extending from the base plate 1210. The base plate 1210 may include a through-hole 1212 configured to allow a rivet 104 to pass through.

Figure 13A:
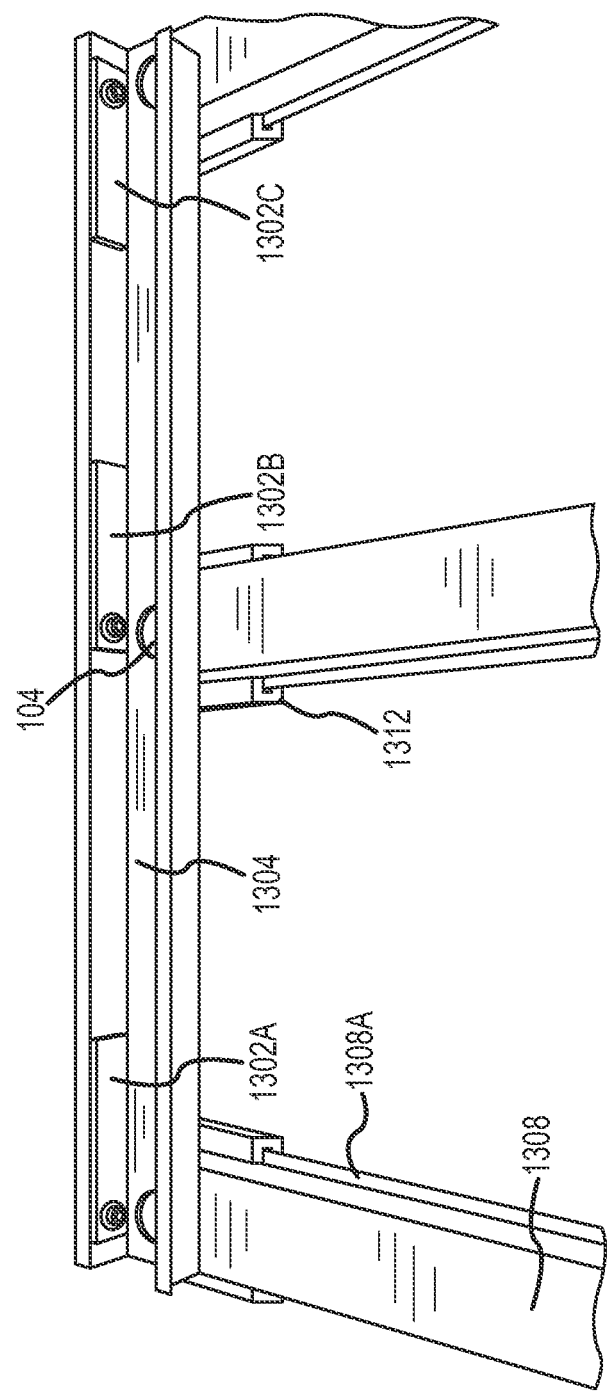
FIG. 13A is a top perspective view of a mounting device including at least two adjustable tabs configured to constrain at least one weight in accordance with at least one embodiment of the present disclosure.

FIG. 13A is a top perspective view of a mount including adjustable tabs configured to constrain weight block in accordance with embodiments of the present disclosure. A mount may include tabs 1302A/1302B/1302C attached to outside top rail 1304 and at least one tab 1302 attached to a bottom rail 1308. The tabs 1302A/1302B/1302C may be a strip configured to attach to the outside top rail 1304. The tabs 1302A/1302B/1302C may be rotated to a folding position, e.g., substantially parallel to the rail 1304 (as shown).

Figure 13B:
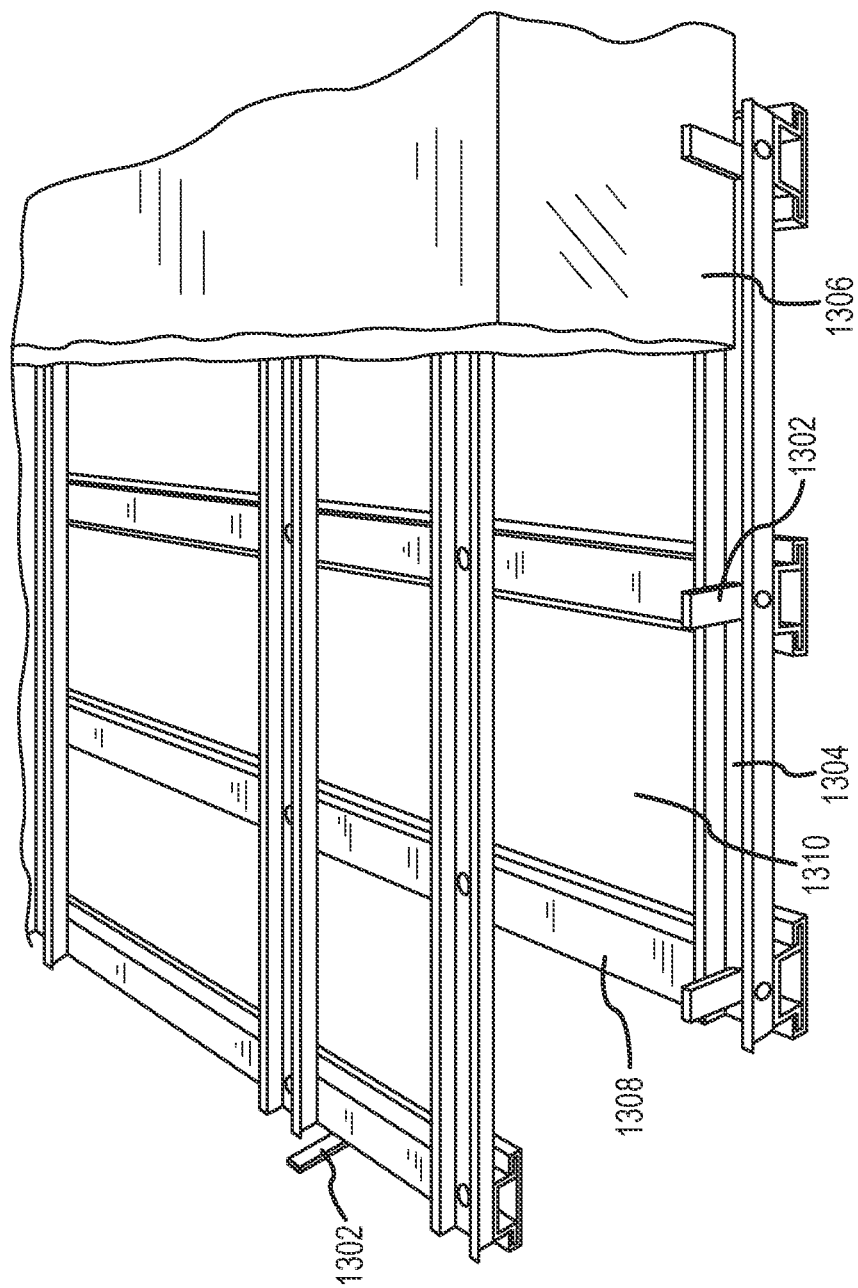
FIG. 13B is a top perspective view of the mounting device of FIG. 13A constraining a weight in accordance with at least one embodiment of the present disclosure.

FIG. 13B is a top perspective view of the mount of FIG. 13A constraining a weigh block 1306 in accordance with embodiments of the present disclosure. The tabs 1302 may be rotated to a holding position as shown in FIG. 13B from the folding position as shown in FIG. 13A. In the holding position, the tabs may extend beyond the top of the outside top rail 1304, which may help constrain a weight block 1306 such that the weight block 1306 may not slip off the top rails, e.g., substantially perpendicular to the top rails. The weight block 1306 may be placed on outside top rails 1304 (as shown). The weight block 1306 may also be sized to fit between top rails and placed on bottom rails 1308 (not shown). The weight block 1306 may also be placed in a space 1310 surrounded by outside rail 1304, a second top rail and two bottom rails 1308 (not shown).

The mount may also include a number of substantially flat sheets 1312 attached to one or more of the bottom rails 1304. The sheets 1312 may be formed of a plastic or a rubber which may help prevent the mount from slipping on a floor. The one or more sheets 1312 may be configured to attach to the extension 1308A from the bottom rail 1308. A top view and a side view of the extension is also shown in FIG. 11.

Figure 13C:
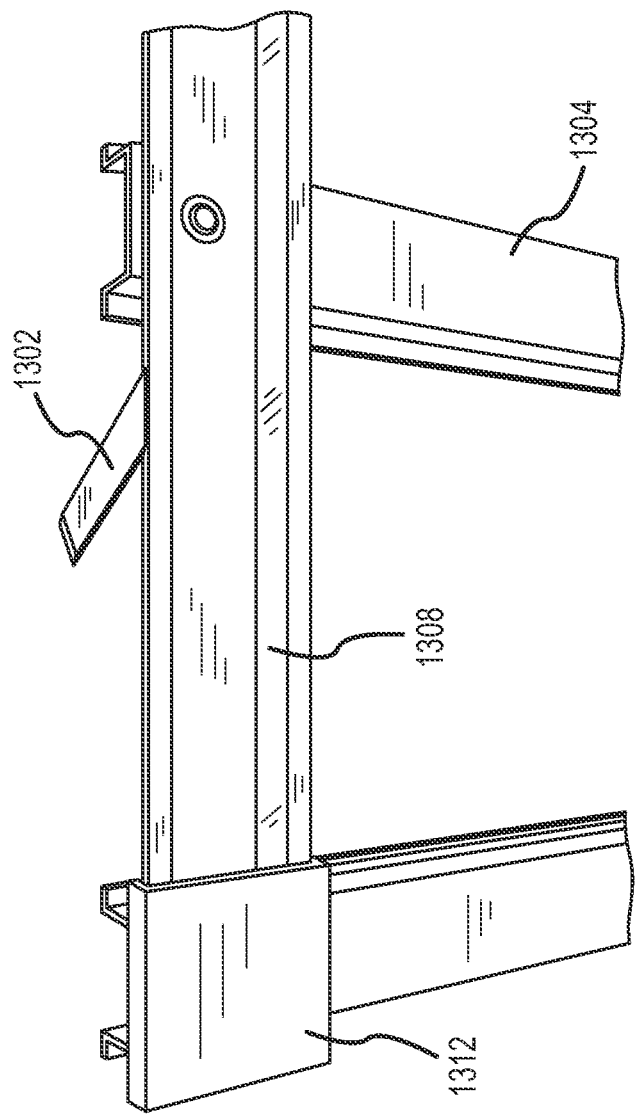
FIG. 13C is a bottom view of a mounting device configured with at least one sheet attached in accordance with at least one embodiment of the present disclosure.

FIG. 13C is an enlarged back perspective view of a sheet 1312 attached to one of the bottom rails 1308 of FIG. 13B. The sheets may be in any shape, including square, circular, rectangular, and the like.

A method for mounting an object to a base includes the operations of: (a) providing a mounting device as disclosed; (b) attaching the device to a base through the second region of the mounting device; and (c) attaching the object to the device through the mounting holes of the first region of the mounting device; (d) attaching the object to the device through the vertical mast holes. In some embodiments, the second region may include mounting holes on some rails. In some embodiments, the second region may be configured to hold ballast materials such as weight blocks within the space between the rails.

It will be appreciated by those skilled in the art that dimensions, shapes, number, and configuration or arrangement of rails, lattice patterns, fasteners, and mounting holes may vary. For example, a rail may have a square cross-section, a rectangular cross-section, a circular cross-section among others.

At least one of the embodiments of the mounting devices of the present disclosure may be designed to be as strong as presently available mounting devices. Similarly, other embodiments of the mounting devices of the present disclosure, may be configured to be capable of holding the object, such as antenna, to withstand higher wind than any presently available antenna mount can withstand. One or more of the embodiments of the mounting devices may be configured to be foldable for transportation and/or storage. It is to be appreciated that the shipping and storage efficiency of at least one of the embodiments of the present disclosure may be significantly improved as a result of folding feature of the mounting device. It is also to be appreciated that for at least one embodiment of the present disclosure, the installation of an object, such as an antenna, on a surface, such as a patio, may be simplified over known presently available approaches.

Having described several embodiments, it will be recognized by those skilled in the art that various modifications, alternative constructions, and equivalents may be used without departing from the spirit of the various embodiments expressly set forth in the present disclosure. Additionally, a number of well-known processes and elements have not been described in order to avoid unnecessarily obscuring the various embodiments set forth in the present disclosure. Accordingly, the above description should not be taken as limiting the scope of the invention.

Those skilled in the art will appreciate that the presently disclosed embodiments teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A device for mounting an object to a base, comprising:
a mounting device comprising a plurality of bottom rails, each rail having a top surface and a bottom surface, orientated along a first direction and on a first plane directly coupled to a plurality of top rails orientated along a second direction and on a second plane,
wherein the second plane is parallel to the first plane,
wherein the mounting device comprises a first region configured to attach the object to the mounting device and a second region configured to attach to the base;
wherein the first region arises from the top surfaces of two or more of the bottom rails; and wherein the second region arises from the bottom surfaces of two or more of the bottom rails;
wherein each of the plurality of bottom rails intersects at least three of the plurality of top rails,
wherein the bottom rails are below the top rails at each intersection; and
a plurality of fasteners configured to directly and rotatably couple the bottom rails to the top rails at two or more intersections of the bottom rails with the top rails such that at least one portion of the mounting device is foldable.

2. The device of claim 1,
wherein the second direction is substantially orthogonal to the first direction when the device is in an expanded configuration.

3. The device of claim 2, further comprising a locking mechanism to lock the rails in the expanded configuration.

4. The device of claim 1, wherein at least one of the bottom rails has a U-shape, I-beam shape, or rectangular tube shape cross-section, and a substantially flat base portion.

5. The device of claim 1, wherein the rails of the mounting device are arranged in a two-dimensional configuration.

6. The device of claim 1, wherein the object comprises an antenna or a table umbrella.

7. The device of claim 1, wherein the base comprises a roof or a patio.

8. The device of claim 1, wherein the plurality of fasteners comprise bolts, screws, or pins.

9. The device of claim 1, wherein each of the first region and the second region comprises a plurality of mounting holes on at least one of the first plurality of rails or at least one of the second plurality of rails.

10. The device of claim 1, wherein the second region is configured to hold weight blocks onto at least one of the first plurality of the rails or at least one of the second plurality of rails.

11. The device of claim 10, wherein the weight block comprises concrete blocks or ballast blocks.

12. The device of claim 1, wherein the rails comprise a metal, a composite or a plastic.

13. The device of claim 1, further comprising a grounding wire attached to the mounting device.

14. The device of claim 1, wherein when configured in an unfolded configuration, the rails form at least one lattice structure.

15. The device of claim 1, comprising a plurality of mounting holes on at least one of the bottom rails or at least one of the top rails.

16. The device of claim 1, wherein at least one of the plurality of bottom rails includes a side-wall and an extension extending perpendicularly outwards from the side wall.

17. The device of claim 1, comprising a sheet, wherein the sheet is configured to attach to at least one of the plurality of bottom rails.

18. A device for mounting an object to a base, comprising:
a mounting device comprising a plurality of bottom rails, each rail having a top surface and a bottom surface, orientated along a first direction and on a first plane directly coupled to a plurality of top rails orientated along a second direction and on a second plane,
wherein the second plane is parallel to the first plane,
wherein the mounting device comprises a first region configured to attach the object to the mounting device and a second region configured to attach to the base;
wherein the first region arises from the top surfaces of two or more of the bottom rails; and
wherein the second region arises from the bottom surfaces of two or more of the bottom rails;
wherein each of the plurality of bottom rails intersects at least three of the plurality of top rails,
wherein the bottom rails are below the top rails at each intersection; and
a plurality of fasteners configured to directly and rotatably couple the bottom rails to the top rails at two or more intersections of the bottom rails with the top rails such that at least one portion of the mounting device is foldable;
wherein the second region comprises at least one first adjustable tab attached to one of the top rails, the at least one first adjustable tab configured to rotate from a folding position to a holding position and extend above the top rail to constrain at least one weight block.

19. The device of claim 18, wherein the at least one adjustable tab is attached to at least one of the top rails in the second region.

20. The device of claim 18, wherein the at least one adjustable tab extends beyond a top portion of the top rails when the at least one adjustable tab is rotated to the holding position.

21. The device of claim 20, wherein the at least one adjustable tab does not extend beyond a top portion of the top rails when the at least one adjustable tab is rotated to the folding position.

22. The device of claim 18, comprising at least one second adjustable tab attached to one of the plurality of bottom rails.

23. The device of claim 22, wherein the at least one second adjustable tab is configured to rotate from a second folding position to a second holding position to constrain at least one second weight block.

24. The device of claim 23, wherein the at least one weight block and the at least one second weight block are the same and the at least one first adjustable tab and the at least one second adjustable tab are configured to constrain the same weight block.

25. The device of claim 18, wherein at least one of the plurality of top rails is U-shaped and having an inner portion and an outer portion and the at least one first adjustable tab is attached to the inner portion.

26. The device of claim 22, wherein the at least one second adjustable tab is attached to an outer portion of at least one of the plurality of bottom rails.

27. The device of claim 18, wherein at least two of the plurality of bottom rails are spaced at a distance to fit a weight block between the at least two bottom rails.

28. The device of claim 1, A device for mounting an object to a base, comprising:
a mounting device comprising a plurality of bottom rails, each rail having a top surface and a bottom surface, orientated along a first direction and on a first plane directly coupled to a plurality of top rails orientated along a second direction and on a second plane,
wherein the second plane is parallel to the first plane,
wherein the mounting device comprises a first region configured to attach the object to the mounting device and a second region configured to attach to the base;
wherein the first region arises from the top surfaces of two or more of the bottom rails; and
wherein the second region arises from the bottom surfaces of two or more of the bottom rails, wherein each of the plurality of bottom rails intersects at least two three of the plurality of top rails, wherein the bottom rails are below the top rails at each intersection, a plurality of fasteners configured to directly and rotatably couple the bottom rails to the top rails at two or more intersections of the bottom rails with the top rails such that at least one portion of the mounting device is foldable, and a locking mechanism to lock the rails in an expanded configuration when the second direction is substantially orthogonal to the first direction;

wherein the locking mechanism comprises a clip having a vertical U-shaped portion and a horizontal U-shaped portion.

* * * * *